(12) United States Patent
Sukhomlinov et al.

(10) Patent No.: US 10,965,597 B2
(45) Date of Patent: Mar. 30, 2021

(54) VIRTUAL NETWORK FUNCTION LOAD BALANCER

(71) Applicant: INTEL CORPORATION, Santa Clara, CA (US)

(72) Inventors: Vadim Sukhomlinov, Santa Clara, CA (US); Kshitij A. Doshi, Tempe, AZ (US); Andrey Chilikin, Limerick (IE)

(73) Assignee: INTEL CORPORATION, Santa Clara, CA (US)

( * ) Notice: Subject to any disclaimer, the term of this patent is extended or adjusted under 35 U.S.C. 154(b) by 749 days.

(21) Appl. No.: 15/640,465

(22) Filed: Jul. 1, 2017

(65) Prior Publication Data

US 2019/0007320 A1    Jan. 3, 2019

(51) Int. Cl.
| | |
|---|---|
| *H04W 4/00* | (2018.01) |
| *H04L 12/803* | (2013.01) |
| *H04L 12/721* | (2013.01) |
| *H04L 12/46* | (2006.01) |
| *H04W 24/02* | (2009.01) |
| *H04L 12/775* | (2013.01) |
| *H04L 12/801* | (2013.01) |
| *H04W 28/02* | (2009.01) |
| *H04L 12/743* | (2013.01) |

(52) U.S. Cl.
CPC ........ *H04L 47/125* (2013.01); *H04L 12/4641* (2013.01); *H04L 45/38* (2013.01); *H04L 45/58* (2013.01); *H04L 45/7453* (2013.01); *H04L 47/12* (2013.01); *H04W 24/02* (2013.01); *H04W 28/02* (2013.01)

(58) Field of Classification Search
CPC ......... H04L 45/38; H04L 47/12; H04L 45/58; H04W 24/02; H04W 28/02
See application file for complete search history.

(56) References Cited

U.S. PATENT DOCUMENTS

| | | | |
|---|---|---|---|
| 10,455,062 B1* | 10/2019 | Balmakhtar | ............ H04L 69/18 |
| 2017/0230252 A1* | 8/2017 | Khasnabish | ............ H04L 43/18 |
| 2017/0318097 A1* | 11/2017 | Drew | ................. H04L 41/0806 |
| 2018/0115485 A1* | 4/2018 | Chiba | ............ H04L 45/74 |
| 2018/0270724 A1* | 9/2018 | Horn | ................. H04W 36/08 |

OTHER PUBLICATIONS

Wang, Richard, "Openflow-Based Load Balancing Gone Wild", Masters Thesis, May 2011, 25 pages.
"SFF Load Balance Feature Proposal", retrieved from <https://wiki.opendaylight.org/view/SFF_Load_Balance_Feature_Proposal>, 5 pages (author and date unknown).

* cited by examiner

*Primary Examiner* — Abdelnabi O Musa
(74) *Attorney, Agent, or Firm* — Kacvinsky Daisak Bluni PLLC

(57) ABSTRACT

Examples may include techniques to route packets to virtual network functions. A network function virtualization load balancer is provided which routes packets to both maximize a specified distribution and minimize switching of contexts between virtual network functions. Virtual network functions are arranged to be able to shift a context from one virtual network function to another. As such, the system can be managed, for example, scaled up or down, regardless of the statefullness of the virtual network functions and their local contexts or flows.

20 Claims, 10 Drawing Sheets

US 10,965,597 B2

VIRTUAL NETWORK FUNCTION LOAD BALANCER

TECHNICAL FIELD

Examples described herein are generally related to configurable computing resources and particularly to managing virtual network functions.

BACKGROUND

Modern computing techniques often employ virtualization. Virtualization has extended from a single application, such as, a virtualized operating system to virtualization of network functions. As network function virtualization is deployed in "cloud" based systems, the ability to perform commissioning, capacity planning, and management of devices grows increasingly complex. This is especially true when interdependencies between virtual network functions are considered.

DETAILED DESCRIPTION

Figure 1:
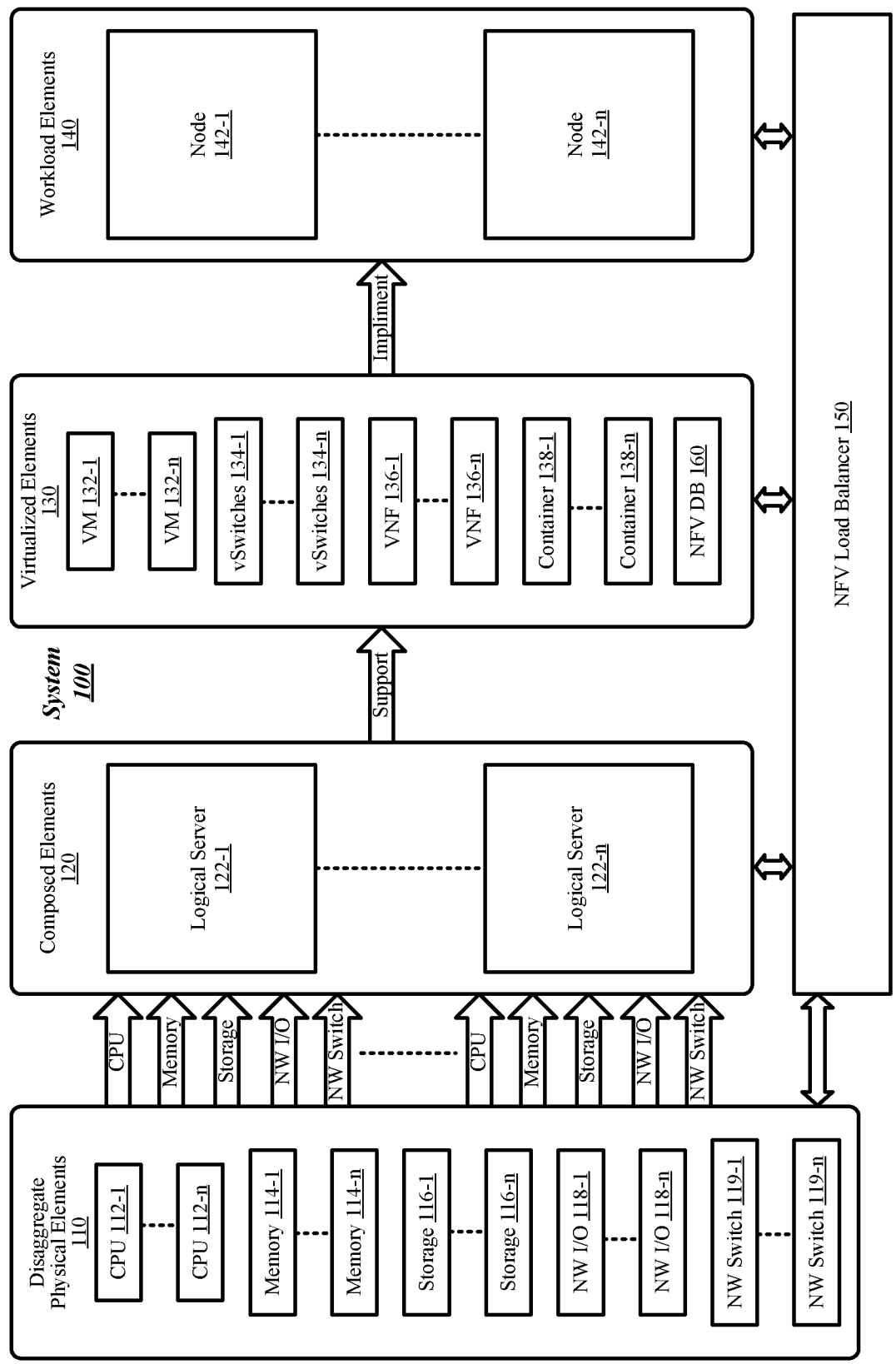
FIG. 1 illustrates an example first system.

Generally, a network function virtualization (NFV) deployment aims to replace dedicated hardware appliances with virtual appliances, for example, to enable consolidation of several dedicated network appliances onto virtual servers, switches and storage. An NFV deployment can include multiple network functions implemented in software. These are typically referred to as virtual network functions (VNFs). VNFs can be instantiated as needed in various locations of a network using virtualized servers, often referred to as "cloud" computing or "fabric" computing.

However, many VNFs are interdependent upon each other. This is commonly referred to as the VNFs being stateful. Said differently, operation of the VNFs, that is, their function, can depend upon the state of other VNFs within the NFV deployment, the prior state of a VNF, or the like. Accordingly, scaling an NFV deployment must account for the statefulness of the VNFs within the NFV deployment. Particularly concerning is scaling an NFV deployment down (e.g., reducing the number of VNFs based on demand, or the like) or migrating VNFs from one virtual server to another.

Conventionally, a VNF, once instantiated, could not be moved or un-instantiated unless there were no longer any affinities to that VNF. Accordingly, these VNF instances would continue to drain resources, prevent effective use of infrastructure, prevent applying security patches to a virtual server, or the like. Furthermore, re-balancing resources is problematic as VNFs cannot be moved conventionally.

The present disclosure provides an NFV load balancer arranged to route traffic to VNFs deployed across virtualized servers. The NFV load balancer can route traffic to ones of the VNFs based on dependencies of the VNFs and based on a specified distribution across the VNFs. An NFV database (DB) is provided to store indications of dependencies, or contexts, of the VNFs. The VNFs can be arranged to query the NFV DB to determine context for received packets. Thus, dependencies and/or "flows" can be migrated between VNFs. As such, the system in which the NFV load balancer, the NFV DB, and the VNFs is deployed can instantiate and/or un-instantiate new VNF instances and can change a specified distribution of traffic across VNFs as needed to manage resources in the system. In some examples, the NFV load balancer can be implemented in accordance with various standards promulgated by the European Telecommunications Standards Institute (ETSI).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an example first system 100. In some examples, system 100 includes disaggregate physical elements 110, composed elements 120, virtualized elements 130, workload elements 140, NFV load balancer 150, and NFV database (DB) 160. In some examples, the NFV load balancer 150 may be arranged to manage or control at least some aspects of disaggregate physical elements 110, composed elements 120, virtualized elements 130 and workload elements 140. More particularly, the NFV load balancer 150 is arranged to manage the flow of traffic to virtual network functions (VNFs) (e.g., VNFs 136-1 to 136-n, or the like) within system 100. With some examples, NFV load balancer 150 can route traffic to VNFs based on various metrics (e.g., resource utilization, latency, network throughput, or the like), dependencies, or known contexts, for the VNFs, and a specified routing distribution. NFV DB 160 can be arranged to store indications of context and/or associations for each of the VNFs within system 100. During operation, VNFs (e.g., VNFs 136-1 to 136-n) can be arranged to query NFV DB 160 and/or other VNFs for context, where context for an incoming packet is unknown. This is described in greater detail below. Overall management and operation of the system 100 may be facilitated by an orchestrator (see FIGS. 2-3), or the like.

With some examples, as shown in FIG. 1, disaggregate physical elements 110 may include CPUs 112-1 to 112-n, where "n" is any positive integer greater than 1. CPUs 112-1 to 112-n may individually represent single microprocessors or may represent separate cores of a multi-core microprocessor. Disaggregate physical elements 110 may also include memory 114-1 to 114-n. Memory 114-1 to 114-n may represent various types of memory devices such as, but not limited to, dynamic random access memory (DRAM) devices that may be included in dual in-line memory modules (DIMMs) or other configurations. Disaggregate physical elements 110 may also include storage 116-1 to 116n. Storage 116-1 to 116n may represent various types of storage devices such as hard disk drives or solid state drives. Disaggregate physical elements 110 may also include network (NW) input/outputs (I/Os) 118-1 to 118-n. NW I/Os 118-1 to 118-n may include network interface cards (NICs) or host fabric interfaces (HFIs) having one or more NW ports w/associated media access control (MAC) functionality for network connections within system 100 or external to system 100. Disaggregate physical elements 110 may also include NW switches 119-1 to 119-n. NW switches 119-1 to 119-n may be capable of routing data via either internal or external network links for elements of system 100.

Composed elements 120 may include logical servers 122-1 to 122-n. For example, groupings of CPU, memory, storage, NW I/O or NW switch elements from disaggregate physical elements 110 may be composed to form logical servers 122-1 to 122-n. Each logical server may include any number or combination of CPU, memory, storage, NW I/O or NW switch elements.

Virtualized elements 130 may include several virtual machines (VMs) 132-1 to 132-n, virtual switches (vSwitches) 134-1 to 134-n, virtual network functions (VNFs) 136-1 to 136-n, or containers 138-1 to 138-n. It is to be appreciated, that the virtual elements 130 can be configured to implement a variety of different functions and/or execute a variety of different applications. For example, the VMs 132-a can be any of a variety of virtual machines configured to operate or behave as a dedicated machine and may execute an individual operating system as part of the VM. VNFs 136-a can be any of a variety of network functions, such as, packet inspection, intrusion detection, accelerators, or the like. The containers 138-a can be configured to execute or conduct a variety of applications or operations, such as, for example, email processing, web servicing, application processing, data processing, or the like.

Virtualized elements 130 may be arranged to form workload elements 140, also referred to as virtual servers. Workload elements can include any combination of ones of the virtualized elements 130, composed elements 140, or disaggregate physical elements 110. Workload elements can be organized into computing nodes, or nodes, 142-1 to 142-n.

Figure 2:
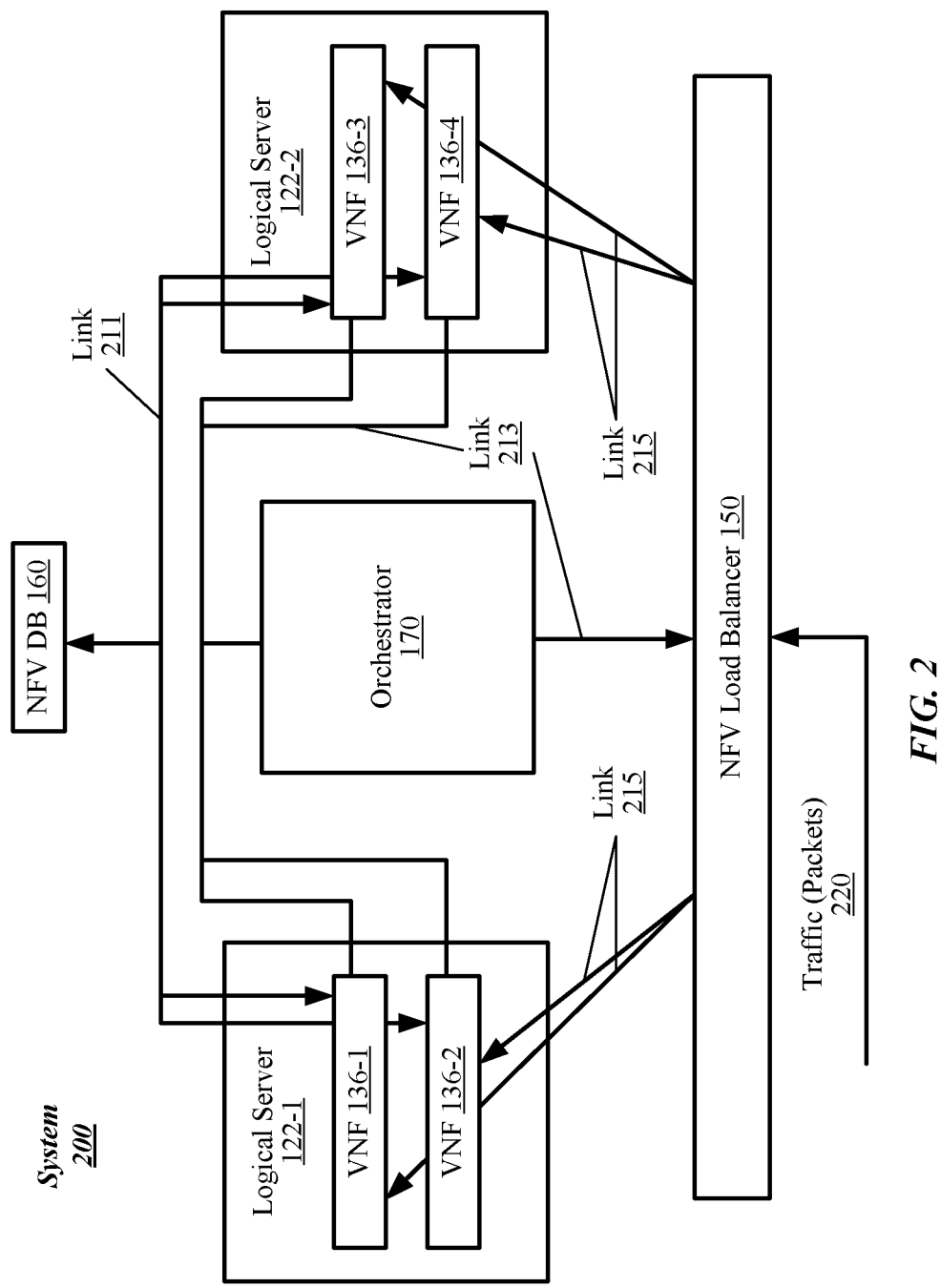
FIG. 2 illustrates an example second system.

FIG. 2 depicts an example system 200. The system 200 may be an example implementation of the system 100 of FIG. 1. It is noted, that system 200 includes reference to elements from system 100. However, this is done for purposes of clarity of presentation and brevity and not to be limiting. As depicted in FIG. 2, system 200 can include logical servers 122-1 and 122-2. Each of logical servers 122-1 and 122-2 can host one or more VNFs 136-a. For example, logical server 122-1 is depicted hosting VNF 136-1 and VNF 136-2 while logical server 122-2 is depicted hosting VNF 136-3 and VNF 136-4. VNFs 136-1 to 136-4 can be communicatively coupled to NFV DB 160. For example, VNFs 136-1 to 136-4 can be coupled to NFV DB 160 via link 211. With some examples, NFV DB 160 can be a distributed DB. For example, each of VNFs 136-1 to 136-4 could implement a portion of NFV DB 160. With some examples, NFV DB 160 could be a combination of a dedicated database and a distributed database. For example, VNFs 136-1 to 136-4 could combined implement a portion of NFV DB 160 while the balance of the database was implemented as a dedicated entity.

System 200 includes an orchestration layer or orchestrator 170. Orchestrator 170 is coupled to VNFs 136-1 to 136-4 and coupled to NFV load balancer 150. In general, orchestrator 170 can be arranged to centralize the management and control of the elements of system 200. That is, orchestrator 170 can control composition of disaggregate physical resources 110 to form composed elements 120 and can control instantiation of virtualized elements 130 onto composed elements 120. NFV load balancer 150 is coupled to VNFs 136-1 to 136-4 via link 215.

With some examples, links 211, 213 and/or 215 can be facilitated by vSwitches (e.g., vSwtiches 134-a in FIG. 1), or the like. Furthermore, communication via links 211, 213 and/or 215 can be implemented using any of a variety of signaling techniques, such as, for example, virtual extensible LAN (VXLAN), remote direct memory access (RDMA), Omni-Path®, or the like.

During operation, system 200 can receive network traffic, or packets 220 (e.g., via vSwtiches 134-a in FIG. 1, or the like) and can route packets to VNFs 136-1 to 136-4 for processing. In general, NFV load balancer 150 can routes packets 220 to VNFs 136-1 to 136-4 to fit a desired, or specified, distribution while minimizing the times a VNF 136-a is routed a packet with which it does not have context. As used herein, the term "context" when related to a packet and VNF is intended to imply the VNF has some association, dependency, knowledge, or statefulness with respect to that packet. Thus, during operation, NFV load balancer 150 can route packets 220 to VNFs 136-1 to 136-4 to fit a specified distribution and to minimize switching of contexts between VNFs. This is described in greater detail below (e.g., see FIGS. 4-8).

Each VNF (e.g., VNFs 136-1 to 136-4), upon receiving a packet 220 from NFV load balancer 150, can apply the same processing flow to the packet. This processing flow is described in greater detail below (e.g., see FIGS. 7-8). However, in general, VNFs 136-1 to 136-4 can parse received packets, extract fields to identify a flow, and determine associated context. In some examples, context can be determined from an internal data structures, by requesting context from another VNF, by requesting context from a database (e.g., NFV DB 160, or the like). During operation, packets can be processed and context determined by VNFs (e.g., VNFs 136-1 to 136-4) and each VNF can report telemetry (e.g., indications of resource utilization, or the like) to NFV load balancer 150.

Figure 3:
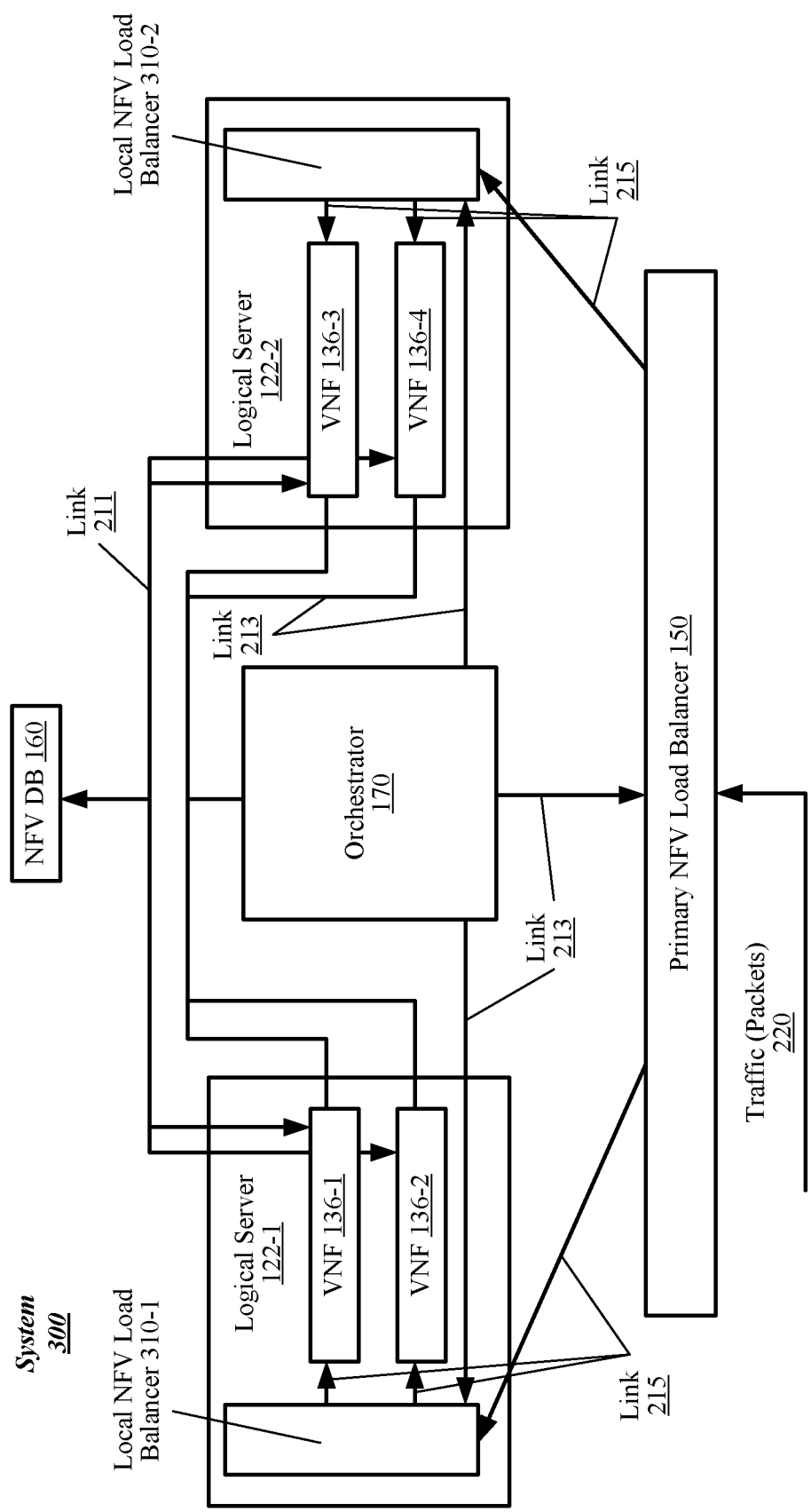
FIG. 3 illustrates an example third system.

In some examples, multiple NFV load balancers can be provided. For example, FIG. 3 illustrates an example system 300. The system 300 may be an example implementation of the system 100 of FIG. 1 or the system 200 of FIG. 2. It is noted, that system 300 includes reference to elements from both systems 100 and 200. However, this is done for purposes of clarity of presentation and brevity and not to be limiting. As depicted in FIG. 3, system 300 includes local NFV load balancers deployed on each logical server in addition the NFV load balancer 150. For example, this figure depicts logical server 122-1 comprising VNFs 136-1 and 136-2 as well as local NFV load balancer 310-1 while logical server 122-2 is depicted comprising VNFs 136-3 and 136-4 as well as local NFV load balancer 310-2.

Local NFV load balancers 310-1 and 310-2 are each coupled to NFV load balancer 150 (indicated as primary NFV load balancer 150 in this figure) and respective VNFs 136-a via links 215. During operation, primary NFV load balancer 150 can receive packet 220 and route packets 220 to local NFV load balancers 310-a. For example, primary NFV load balancer 150 could receive a packet and route the packet to local NFV load balancer 310-1 or route the packet to local NFV load balancer 310-2. Subsequently, the local NFV load balancer 310-a can route the packets to VNFs instantiated within the respective logical server in which the local NFV load balancer is implemented. In general, primary NFV load balancer 150 and local NFV load balancers 310-a can route packets 220 to fit a desired, or specified, distribution while minimizing the number of context switches between VNFs 136-1 to 136-4.

Figure 4:
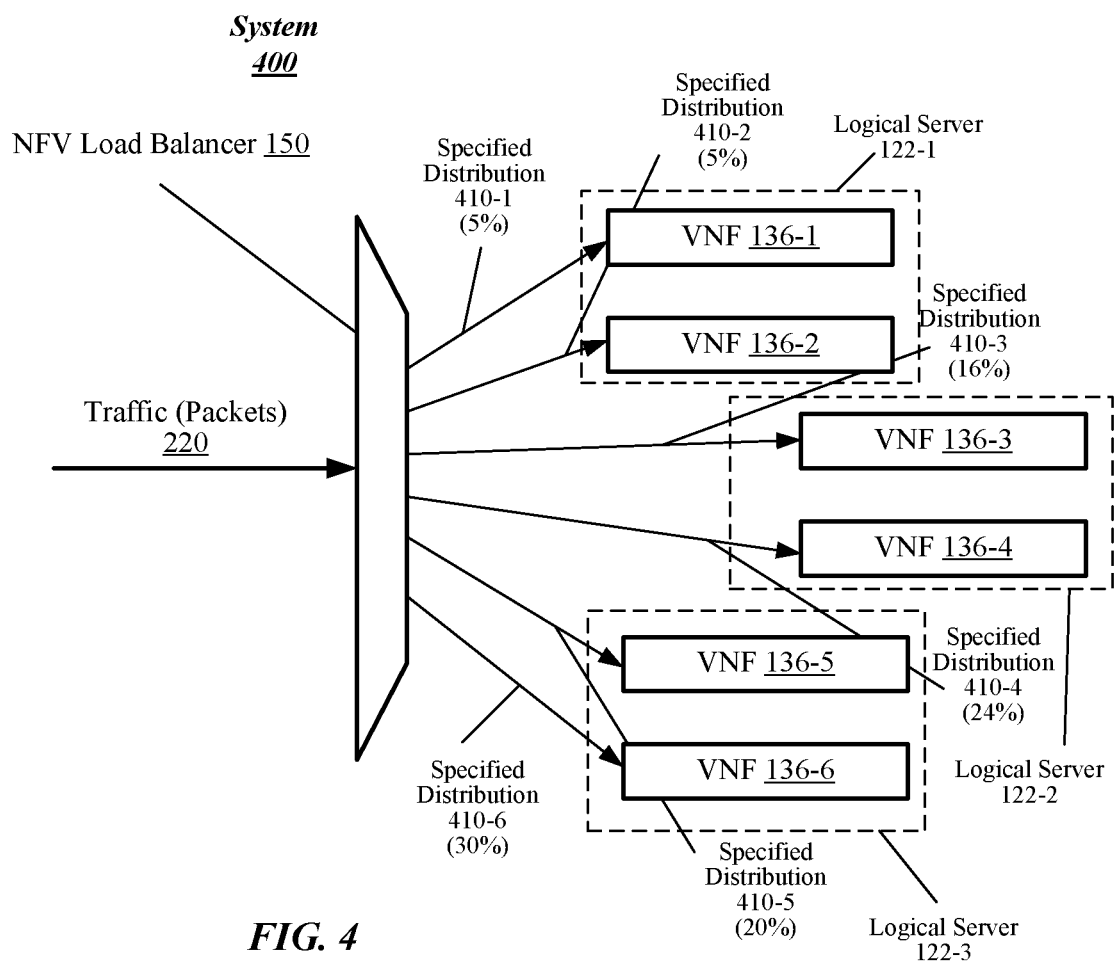
FIG. 4 illustrates an example fourth system.
Figure 5:
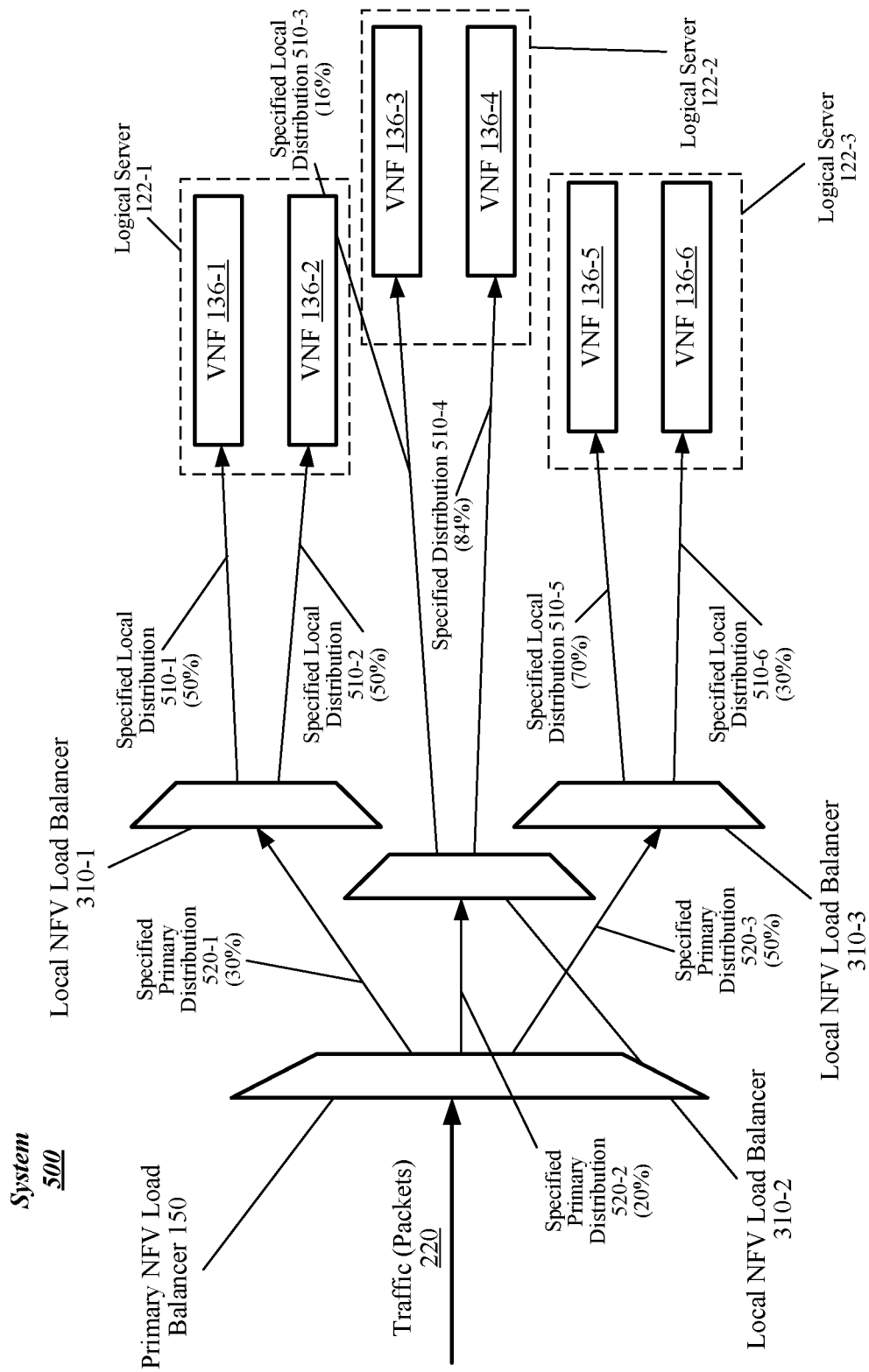
FIG. 5 illustrates an example fifth system.

FIGS. 4-5 depict example specified or desired distributions of packet routing across a set of VNFs. In particular, FIG. 4 depicts an example system 400 having a singular NFV load balancer and specified routing distributions for the VNFs within the system 400 while FIG. 5 depicts an example system 500 having a primary NFV load balancer and local NFV load balancers and specified routing distributions for each level. The systems 400 and 500 may be an example implementation of the system 100 of FIG. 1, the system 200 of FIG. 2, and/or the system 300 of FIG. 3. It is noted, that system 400 and 500 includes reference to elements from systems 100, 200, and/or 300. However, this is done for purposes of clarity of presentation and brevity and not to be limiting. Furthermore, it is noted, that the NFV load balancers route packets to fit a specified distribution and to minimize switching of contexts between VNFs. As such, in some examples, the routing may not entirely fit within the specified distribution. This is described in greater detail below.

Turning more particularly to FIG. 4, system 400 includes logical server 122-1, logical server 122-2, and logical server 122-3. Each of logical servers 122-1 to 122-3 can host one or more VNFs 136-a. For example, logical server 122-1 is depicted hosting VNF 136-1 and VNF 136-2; logical server 122-2 is depicted hosting VNF 136-3 and VNF 136-4; and logical server 122-3 is depicted hosting VNFs 136-5 and 136-6.

NFV load balancer 150 can be arranged to route packets 220 to fit specified distribution 410. For example, specified distribution 410 depicts in this figure is illustrated in the following table:

TABLE 1

| Example Distribution for System 400 | | | | | |
|---|---|---|---|---|---|
| VNF 136-1 Distribution 410-1 | VNF 136-2 Distribution 410-2 | VNF 136-3 Distribution 410-3 | VNF 136-4 Distribution 410-4 | VNF 136-5 Distribution 410-5 | VNF 136-6 Distribution 410-6 |
| 5% | 5% | 16% | 24% | 20% | 30% |

It is noted, that the example distribution 410 depicted in this figure and given in the table above is provided for illustration purposes only. With some examples, the specified distribution 410 can be generated by the NFV load balancer 150, by the orchestrator 170, or provided by a customer, such as, for example, specified in a service level agreement (SLA), or the like. With some examples, the specified distribution 410 can be linear.

Turning more particularly to FIG. 5, system 500 includes logical server 122-1, logical server 122-2, and logical server 122-3. Each of logical servers 122-1 to 122-3 can host one or more VNFs 136-a. For example, logical server 122-1 is depicted hosting VNF 136-1 and VNF 136-2; logical server 122-2 is depicted hosting VNF 136-3 and VNF 136-4; and logical server 122-3 is depicted hosting VNFs 136-5 and 136-6.

Furthermore, system 500 includes local NFV load balancers 310-a for each of the logical servers 122-a. For example, system 500 is depicted including local NFV load balancers 310-1, 310-2 and 310-3 coupled to logical servers 122-1 to 122-3, respectively. Primary NVF load balancer 150 is coupled to local NFV load balancers 310-a.

Primary NFV load balancer 150 can be arranged to route packets 220 to local NFV load balancers to fit specified distribution 520 while local NFV load balancers 310-a can be arranged to route packets 220 to respective VNFs 136-a to fit specified distribution 510. For example, specified distributions 510 and 520 are depicted in this figure are illustrated in the following table:

TABLE 2

| Example Distribution for System 500 | | | | | |
|---|---|---|---|---|---|
| Local NFV LB 310-1 Distribution 520-1 | | Local NFV LB 310-2 Distribution 520-2 | | Local NFV LB 310-3 Distribution 520-3 | |
| 30% | | 20% | | 50% | |
| VNF 136-1 Distribution 510-1 | VNF 136-2 Distribution 510-2 | VNF 136-3 Distribution 510-3 | VNF 136-4 Distribution 510-4 | VNF 136-5 Distribution 510-5 | VNF 136-6 Distribution 510-6 |
| 50% | 50% | 16% | 84% | 70% | 30% |

It is noted, that the example distributions 510 and 520 depicted in this figure and given in the table above are provided for illustration purposes only. With some examples, the specified distributions 510 and 520 can be generated by the NFV load balancers, by the orchestrator 170, or provided by a customer, such as, for example, specified in a service level agreement (SLA), or the like. With some examples, the specified distributions 510 and/or 520 can be linear.

Figure 6:
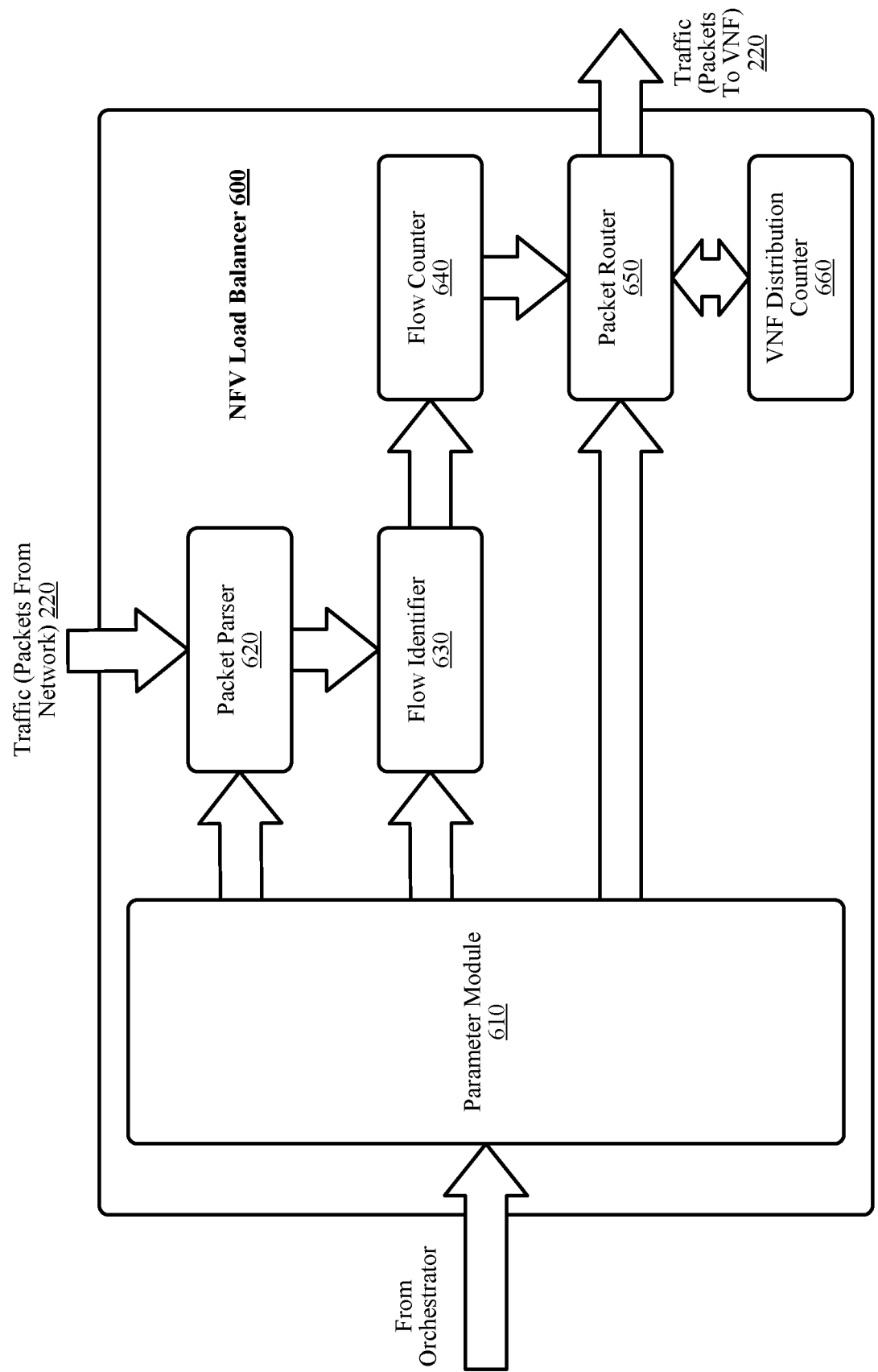
FIG. 6 illustrates an example network function virtualization load balancer.

FIG. 6 depicts an example NFV load balancer 600. NFV load balancer 600 may be implemented as NFV load balancer 150 from any one of systems 100, 200, 300, 400, or 500. Furthermore, NV load balancer 600 may be implemented as one of local NFV load balancers 310-*a* from any one of systems 300 or 500. As depicted, NFV load balancers 600 can include a parameter module 610, a packet parser 620, a flow identifier 630, a flow counter 640, a packet router 650, and a VNF distribution counter 660.

In general, NFV load balancer 600 can be implemented as hardware, software, or a combination of hardware and software. For example, with some implementations, NFV load balancer 600 can be implemented using application specific integrated circuits, field-programmable gate arrays, digital logic components, or the like, arranged to operate as detailed herein. In other examples, NFV load balancer 600 can include a processor component and a memory comprising instructions, executable by the processor component, which execution of these instructions cause the processor component to operate as detailed herein (see FIG. 10). Examples are not limited in this context.

In general, NFV load balancer 600 operates as follows. Network traffic, for example, packets 220, are received at packet parser 620. Packet parser 620 extracts fields from packets 220. In general, packet parser 620 can extract any of a variety of fields from incoming packets. However, in practice, packet parser 620 can extract fields from incoming packets 220 to determine a context or "flow" for which the packets are associated. In some implementations, packet parser 620 can extract components of the packets, such as, for example, the tuple components of a transmission control protocol (TCP) internet protocol (IP) (TCP/IP) packet (e.g., 5-tuple, 12-tuple, or the like). In some implementations, packet parser 620 can extract an address component of the packet (e.g., media access control (MAC), a sending MAC, a destination MAC, or a sending/destination MAC pair, or the like).

NFV load balancer 600 can receive information elements and/or control signals from orchestrator 170, which can include indication of fields to extract from incoming packets. For example, in some implementations, parameter module 610 can receive an information element including indication of fields to extract form incoming packets 220. During operation, packet parser 620 can extract fields from incoming packets 220 based on the indications received by the parameter module 610.

Flow identifier 630 can determine a "flow" or a context for the incoming packet 220 based on the extracted fields. In some examples, flow identifier 630 can implement a hash table to map extracted fields to flows. In some examples, flow identifier 630 can implement bitmasks, table trees, access control lists, or the like to map extracted fields to flows. As a specific example, flow identifier can implement a hash function over extracted fields to map extracts fields to "hash buckets," which correspond to flows or contexts for the incoming packets.

Flow counter 640 can count the number of times a context or flow is identified by flow identifier 630. For example, flow counter 640 can determine each time a particular flow is identified based on hashing the extracted fields by flow identifier and can increment a counter for the particular flow.

NFV load balancer 600 can receive information elements and/or control signals from orchestrator 170, which can include indication of a hashing function. For example, in some implementations, parameter module 610 can receive an information element including indication of a hashing function to implement by flow identifier 630. Thus, during operation, flow identifier 630 can hash extracted fields of packets 220 using the received hashing function to identify flow buckets.

Packet router 650 can map an incoming packet to a VNF (e.g., VNF 136-*a*, or the like) based on the flow identified by flow identifier 630 and based on a specified distribution. As detailed above, packet router 650 routes an incoming packet 220 to a VNF to satisfy a specified distribution while minimizing switching of contexts between VNFs. In some examples, packet router 650 can implement an algorithm to route packets to both maximize the specified distribution while minimizing context switching between VNFs.

NFV load balancer 600 can receive information elements and/or control signals from orchestrator 170, which can include indication of the specified distribution. For example, in some implementations, parameter module 610 can receive an information element including indication of a specified distribution (e.g. distributions 410, 510 and 520, or the like). During operation, packet router 650 can route packets based on the indications received by the parameter module 610 as well as the identified flow.

With some implementations, NFV load balancer 150 can implement risk distribution techniques. For example, NFV load balancer 150 can route a single packet 220 to multiple VNFs for redundancy and/or high availability implementations. As such, a routing table comprising indications of VNFs that own a context, or VNFs where a context associated with a packet is local to the VNFs can include multiple VNFs for a single context. As such, the packet can be routed to several VNFs in parallel.

VNF distribution counter 660 can count the number of times a packet 220 is routed to each respective VNF (e.g., VNF 136-*a*, or the like). For example, VNF flow counter 640 can determine each time a specific VNF is routed a packet 220 and can increment a counter for the specific VNF.

In some implementations, the NFV load balancer 600 can be arranged to minimize routing packets of the same context to different VNFs. Said differently, NFV load balancer 600 can be arranged to minimize shuffle of contexts between VNFs, which leads to transfers of packet context between VNFs or from the NFV DB to a VNF. To that end, the NFV load balancer 600 is arranged to compute (e.g., periodically, repeatedly, continuously, or the like) an actual distribution of packet routing to the VNFs and determine a modification (or change) in routing that will move the actual distribution closer to a specified distribution (e.g. distributions 410, 510 and 520, or the like).

Accordingly, the flow counter 640 can be arranged to determine a hash bucket corresponding to an incoming packet while the VN distribution counter 660 can be arranged to count the number of times packets are routed through each hash bucket. NFV load balancer 600, or packet router 650, can determine which VNFs to route the packets to achieve the specified distribution based on the determined hash bucket and the count of the number of times packets have been routed through each bucket.

As noted, in some examples, the packet router 650 can route packets to a VNF for which the packet context is new, resulting in a shuffling, or movement of the packet context from another VNF or the NFV DB to the VN receiving the packet. With some implementations, the packet router 650 can be arranged to limit the rate at which context shuffles occur. For example, the packet router 650 can be arranged to limit routing packets resulting in a context shift to less than a threshold number within a specified time (e.g., 1 context shift every 1 second, or the like). This threshold amount is sometimes referred to as a threshold context switching limit.

Figure 7:
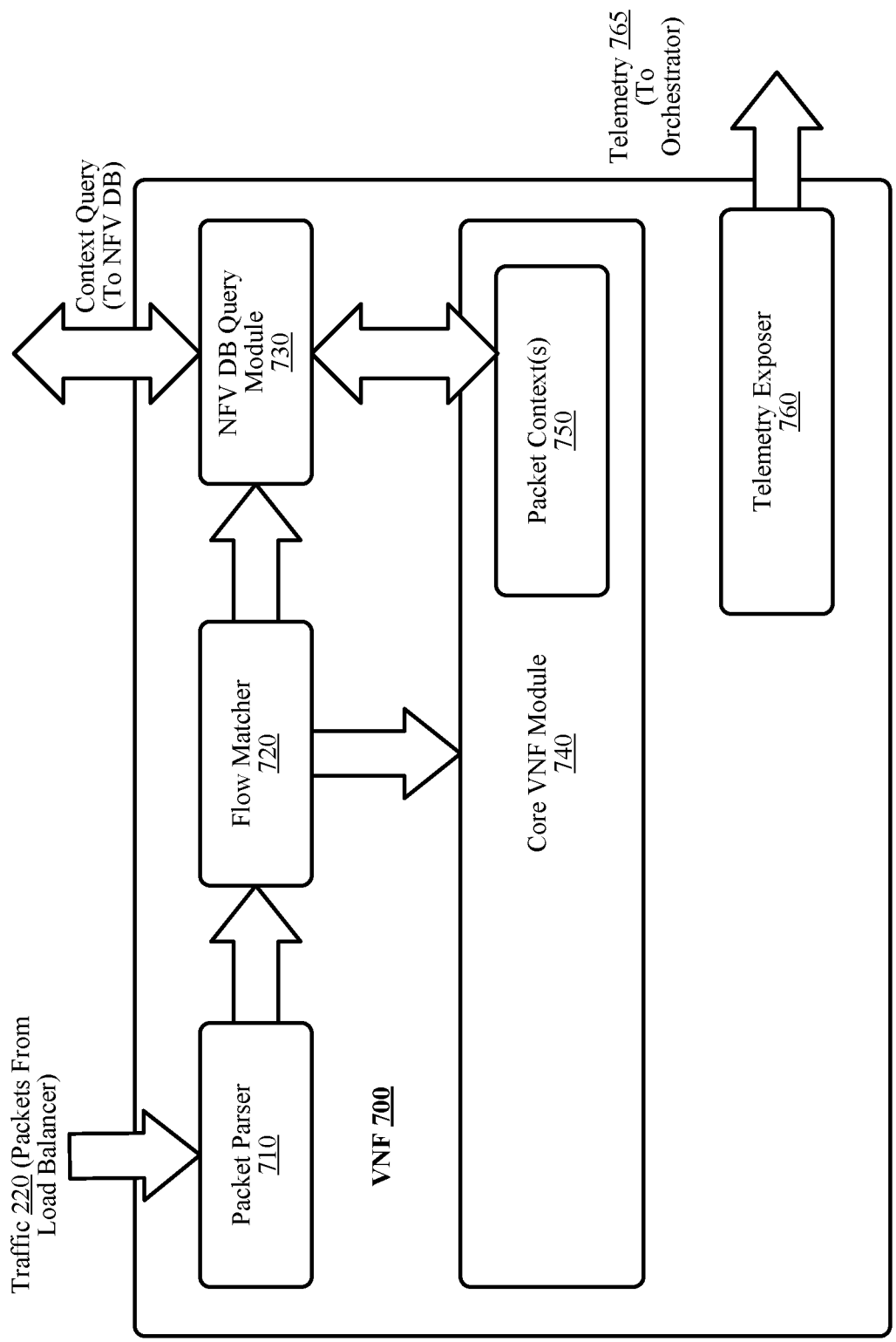
FIG. 7 illustrates an example virtual network function.

FIG. 7 depicts an example VNF 700. VNF 700 may be implemented as any one of the VNFs 136-a from any one of systems 100, 200, 300, 400, or 500. As depicted, VNF 700 can include a packet parser 710, a flow matcher 720, a NFV DB query module 730, and a core VNF module 740. As detailed above, in many implementations, VNFs, such as, VN 700, are stateful. That is, VNF 700 may include one or more packet contexts 750 associated within oncoming packets 220. Core VNF module 740 can utilize packet context 750 to process the packet and implement the core VNF function. Furthermore, in some examples, VN 700 can include a telemetry exposer 760.

During operation, network traffic, for example, packets 220, are received, from NFV load balancer (e.g., NFV load balancer 150, local NFV load balancer 310, or the like) at packet parser 710. Packet parser 710 extracts fields from packets 220. In general, packet parser 710 can extract any of a variety of fields from incoming packets. However, in practice, packet parser 710 can extract fields from incoming packets 220 to determine a context or "flow" for which the packets are associated. In some implementations, packet parser 710 can extract components of the packets, such as, for example, the tuple components of a transmission control protocol (TCP) internet protocol (IP) (TCP/IP) packet (e.g., 5-tuple, 12-tuple, or the like). In some implementations, packet parser 710 can extract an address component of the packet (e.g., media access control (MAC), a sending MAC, a destination MAC, or a sending/destination MAC pair, or the like).

VNF 700, like NFV load balancer 600, can receive information elements and/or control signals from orchestrator 170, which can include indication of fields to extract from incoming packets. Flow identifier 720 can determine a "flow" or a context for the incoming packet 220 based on the extracted fields. In some examples, flow identifier 720 can implement a hash table to map extracted fields to flows. In some examples, flow identifier 720 can implement bitmasks, table trees, access control lists, or the like to map extracted fields to flows. As a specific example, flow identifier 720 can implement a hash function over extracted fields to map extracts fields to "hash buckets," which correspond to packet contexts 750.

Flow matcher 720 can initiate processing of received packets by core VNF module 740, for example, where flow matcher 720 determines (e.g., based on hashing extracted fields) that the packet context 750 for the received packet 220 is known. Alternatively, NFV DB query module 730 can query NFV DB 160 for packet context 750, for example, where flow matcher 720 determines (e.g., based on hashing extracted fields) that the packet context 750 for the received packet 220 is not known.

In some implementations, NFV query module 730 can implement a queue (e.g., an asynchronous queue, or the like) in which to pipeline received packets 220 where packet context 750 is unknown. In some cases, NFV query module 730 can receive an indication from the NFV DB 160 that the packet context is unknown. For example, in the case of a new (e.g., to the system, or the like) flow. In such an example, core VNF module 740 can process the received packet and start new packet context 750 for new flow. In some cases, NFV query module 730 can return an indication of packet context 750. For example, in the case of a rebalanced or transferred flow. In such an example, core VNF module 740 can process the received packet using the received packet context 750. Furthermore, the NFV DB 160 can mark VN 700 as the owner of the packet context.

Telemetry exposer 760 can provide indication of telemetry information 765 (e.g., processor utilization, cache utilization, I/O, memory utilization, or the like) to orchestrator 160.

Figure 8:
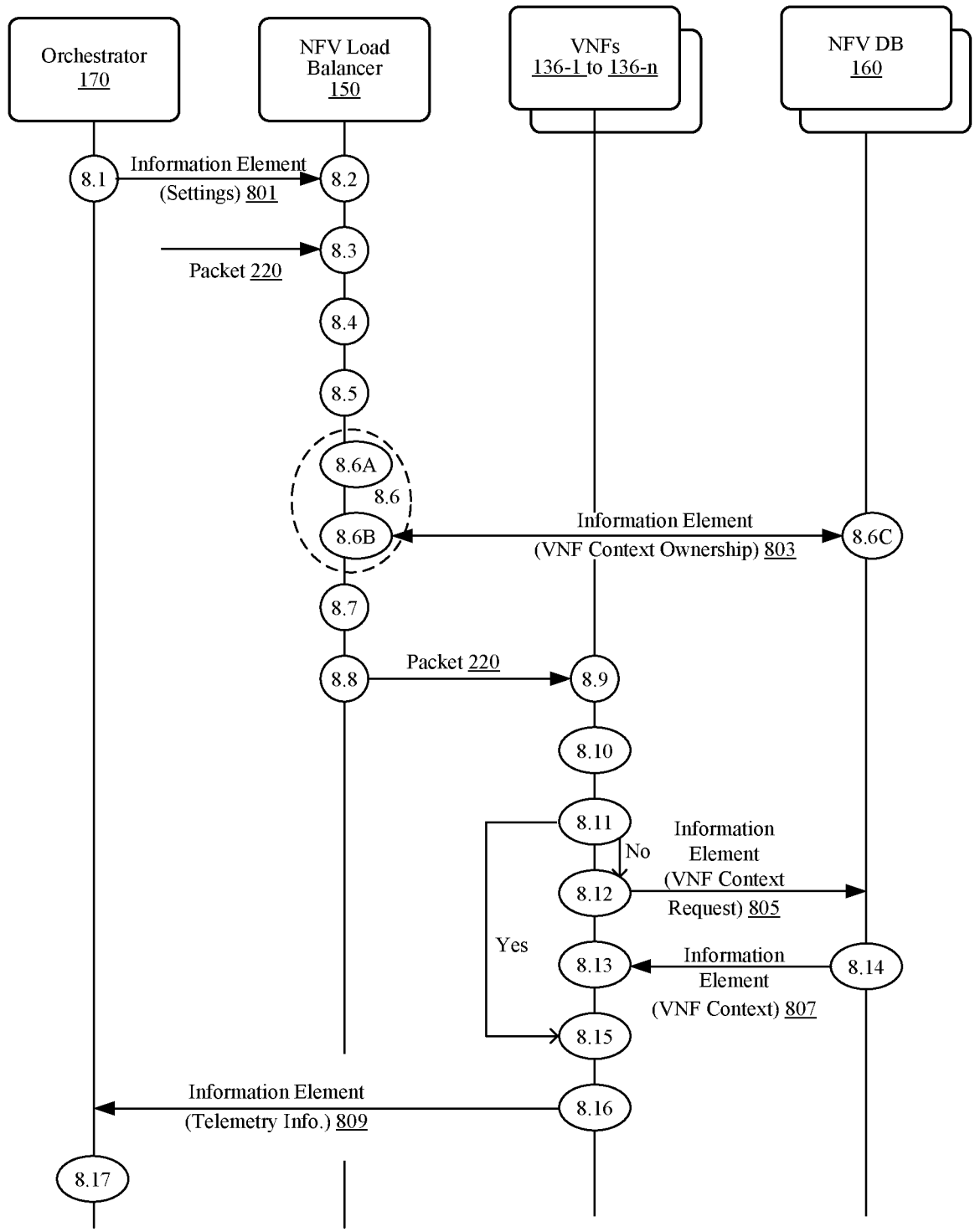
FIG. 8 illustrates an example technique to load balance packet routing in a system with stateful virtual network functions.

FIG. 8 illustrates an example technique 800 to load balance for stateful VNFs. In some examples, the technique 800 can be implemented by any one of the systems depicted herein. For example, technique 800 can be implemented by system 100 of FIG. 1, system 200 of FIG. 2, system 300 of FIG. 3, system 400 of FIG. 4, system 500 of FIG. 5, or the like. Technique 800 can begin at circle 8.1. At circle 8.1, orchestrator 170 can send an information element 801 to NFV load balancer 150 including an indication of one or more settings for routing packets within system 100. For example, information element 801 can include an indication packet fields to extract, a hash function to determine context from extracted elements, a designated routing distribution, or the like. At circle 8.2, NFV load balancer 150 can receive the information element 801 including the indications of the settings for routing packets within system 100.

Continuing to circle 8.3, NFV load balancer 150 can receive a packet 220. At circle 8.4, NFV load balancer can extract fields from the packet 220. For example, packet parser 620 can extract fields from packet 220. Continuing to circle 8.5, NFV load balancer can determine a context or a flow for packet 220. For example, flow identifier 630 can hash the fields of packet 220 extracted at circle 8.4 to determine a flow or context bucket associated with the packet 220.

Continuing to circle 8.6, VNF load balancer 150 can determine a one of VNFs 136 that owns the packet 220, or more specifically, is associated with and has context for the flow associated with the packet 220. With some examples, NFV load balancer 150 can maintain indications (e.g., a table, a directory, a bitmap, or the like) of VNF ownership for context buckets determined by hashing extracted fields from packet 220. Circle 8.6 can include circle 8.6A, at circle 8.6A, NFV load balancer 150 can determine a VNF 136 that owns the flow associated with packet 220 from the maintained indications. In other examples, NFV load balancer 150 can determine VNF ownership for context buckets from NFV DB 160. For example, circle 8.6 can include circles 8.6B and 8.6C. At circles 8.6B and 8.6C, NFV load balancer 150 can exchange information elements 803 with NFV DB 160 including a request for indication of a VNF that owns the flow associated with packet 220 and a response from the NFV DB 160 including the indication of the VNF.

Continuing to circle 8.7, NFV load balancer 150 can determine a VNF 136 with which to route packet 220 based on a variety of factors. As detailed above, NFV load balancer 150 can make routing decisions based on maximizing adherence to the stated routing distribution while minimizing movement (or switching) of contexts between VNFs.

Continuing to circle 8.8 and 8.9. At circle 8.8, NFV load balancer 150 can route the packet 220 to the VNF (e.g., VNF 136-1) selected at circle 8.7. At circle 8.9, the VNF (e.g., VN 136-1) can receive the packet from NFV load balancer 150.

Continuing to circle 8.10, VNF 136-1 can determine a context for packet 220. With some implementations, VNF 136-1 can extract fields from packet 220 and hash the fields to determine a context. For example, VNF 136-1 can implement operations described above for circles 8.4 and 8.5. In some implementations, VNF 136-1 can retrieve the previously hashed bucket from NFV load balancer. For example, NFV load balancer 136 can communicate the previously determined context as part of routing packet 220 to the VNF.

Continuing to circle 8.11, VNF 136-1 can determine whether the context associated with packet 220 is local to the VNF. Said differently, the VNF 136-1 can determine whether VNF 136-1 owns the context associated with packet 220. Based on a determination that VN 136-1 does own the context, technique 800 can skip to circle 8.15. However, based on a determination that VN 136-1 does not own the context, technique 800 can continue to circle 8.12.

At circle 8.12, VNF 136-1 can query the NFV DB 160 to determine an owner for the context associated with packet 220. For example, NFV DB query module 730 can send a request for NFV DB 160 for an indication of an owner of the context associated with packet 220. Continuing to circles 8.13 and 8.14, VNF 136-1 can add the packet 220 to a processing queue while waiting for context 750. At circle 8.14, NFV DB 160 can send an information element 807 including an indication of an owner of the context associated with packet 220. In some examples, no owner is specified, in which case, VNF 136-1 can initiate or create the context 750. In other examples, a one of VNFs 136-2 to 136-n is specified and context 750 can be retrieved from either the NFV DB 160 and/or the specified VNF. Additionally, at circle 8.14, the NFV DB 160 can designate the VNF 136-1 (e.g., the VNF requesting context) as the owner (or new owner) of the context.

At circle 8.15, VN 136-1 can process the packet 220 as normal. VNF 136-1 can retrieve packet 220 from the queue and process the packet based on the context 750 (e.g., context retrieved from other VNF, context retrieved from NFV DB 160, or context created as context is new to the system, or the like). Technique 800 can optionally, include circle 8.16. At circle 8.16, VN 136-1 can send an information element 809 including indications of telemetry information for VNF 136-1 to orchestrator 170.

Continuing to circle 8.17, orchestrator 170 can manage VNFs within system. For example, orchestrator can instantiate new VNFs, can un-instantiate existing VNFs, can relocate VNFs from one logical server to another (e.g., to provide proximity to VNFs and packet origination, etc.), or the like. Furthermore, orchestrator 170 can update a specified distribution for routing packets 220 based on updated telemetry information and can return to circle 8.1 to provide updated routing distributions to NFV load balancer 150.

It is important to note, that technique 800 can be extended to multiple levels of load balancing (e.g., where a primary and one or more levels of secondary routing exist).

Figure 9:
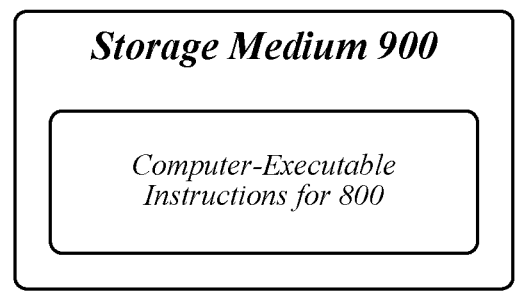
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement technique 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
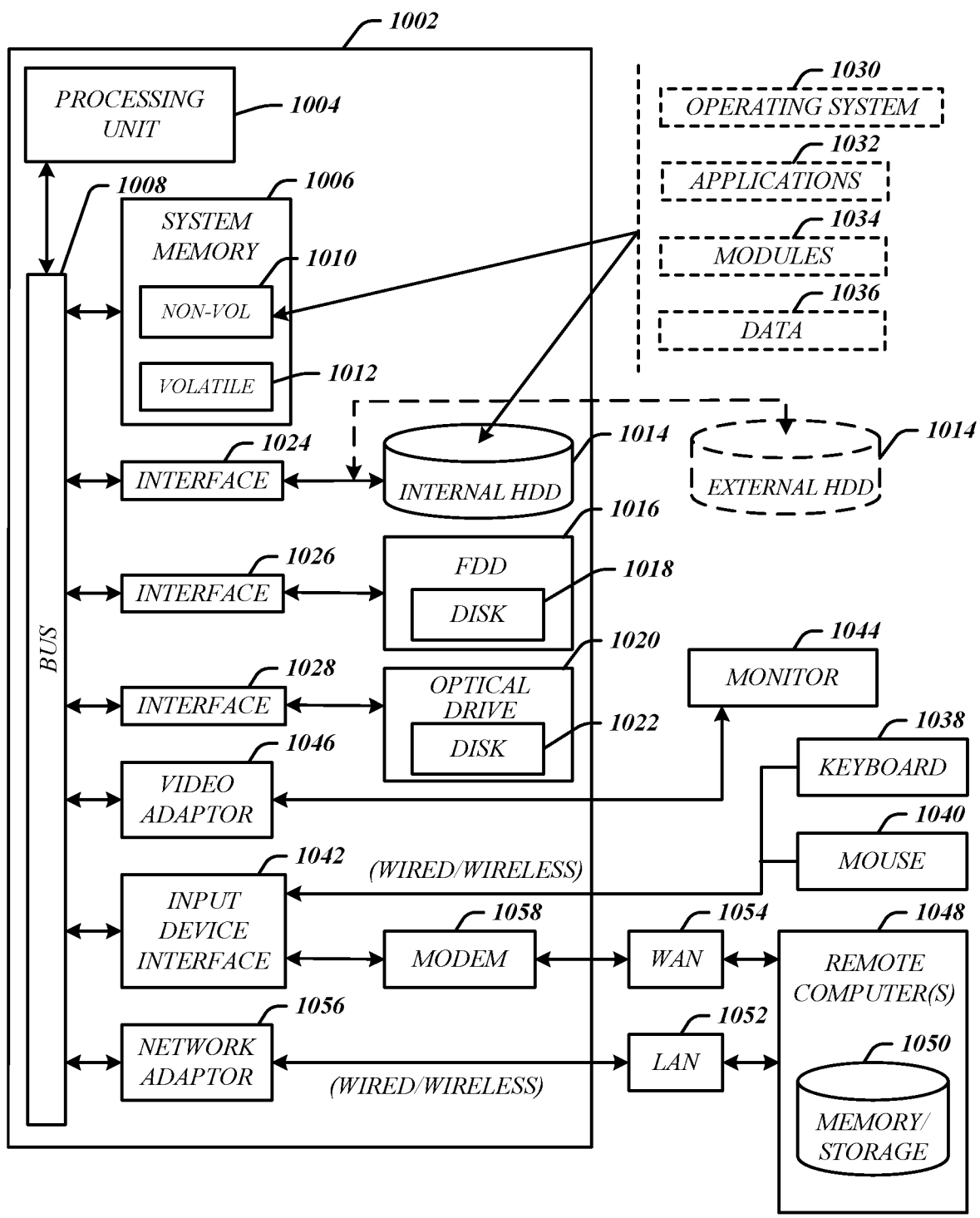
FIG. 10 illustrates an example computing platform.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of portions of system 100, such as, NFV load balancer 150. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of NFV load balancer 150 and/or VNFs 136-a.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1384 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1

An apparatus comprising: circuitry, at least a portion of which is implemented in hardware, the circuitry to: extract at least one field from a packet; determine a context associated with the packet based on the at least one field; identify a first virtual network function (VNF) of a plurality of VNFs associated with the determined context; and route the packet to a one of the plurality of VNFs based at least in part on the context, the identified first VNF, and a target routing distribution for the plurality of VNFs.

Example 2

The apparatus of claim 1, wherein the one VNF is the first VNF.

Example 3

The apparatus of claim 1, the circuitry to maximize adherence with the target routing distribution and minimize routing the packet to the one of the plurality of VNFs different than the first VNF.

Example 4

The apparatus of claim 1, the circuitry to calculate hash function on the at least one field from the packet to determine the context.

Example 5

The apparatus of claim 4, the circuitry to: determine a hash bucket corresponding to the determined context based on the calculated hash function; count a number of times packets have been routed to the hash bucket; and select the one of the plurality of VNFs to route the packet to based at least in part on the determined hash bucket and the number of times packets have been routed to the hash bucket.

Example 6

The apparatus of claim 5, the circuitry to determine the hash bucket based on the target routing distribution.

Example 7

The apparatus of claim 1, the circuitry to limit routing the packet to the one of the plurality of VNFs different than the first VNF based on a threshold context switching limit.

Example 8

The apparatus of claim 1, wherein the one VNF is not the first VNF.

Example 9

The apparatus of claim 1, the circuitry to: determine, from a routing table, whether a one of the plurality of VNFs is associated with the context; and identify the first VNF as the one of the plurality of VNFs based on a determination that the one of the plurality of VNFs is associated with the context.

Example 10

The apparatus of claim 1, the circuitry to route the packet to a second one of the plurality of VNFs in parallel to routing the packet to the one of the plurality of VNFs based at least in part on the context, the identified first VNF, and a target routing distribution for the plurality of VNFs.

Example 11

A system comprising: a plurality of virtual network functions (VNFs) hosted on one or more logical servers; a memory comprising a network function virtualization (NFV) database (DB) coupled to the one or more logical servers, the NFV DB comprising indications of a context associated with the plurality of VNFs; and a NFV load balancer comprising circuitry, at least a portion of which is implemented in hardware, the circuitry to: extract at least one field from a packet; determine a context associated with the packet based on the at least one field; identify a first VNF of the plurality of VNFs associated with the determined context; and route the packet to a one of the plurality of VNFs based at least in part on the context, the identified first VNF, and a target routing distribution for the plurality of VNFs.

Example 12

The system of claim 11, wherein the one VNF is the first VNF.

Example 13

The system of claim 11, the circuitry to maximize adherence with the target routing distribution and minimize routing the packet to the one of the plurality of VNFs different than the first VNF.

Example 14

The system of claim 11, the circuitry to calculate hash function on the at least one field from the packet to determine the context.

Example 15

The system of claim 14, the circuitry to: determine a hash bucket corresponding to the determined context based on the calculated hash function; count a number of times packets have been routed to the hash bucket; and select the one of the plurality of VNFs to route the packet to based at least in part on the determined hash bucket and the number of times packets have been routed to the hash bucket.

Example 16

The system of claim 15, the circuitry to determine the hash bucket based on the target routing distribution.

Example 17

The system of claim 11, the circuitry to limit routing the packet to the one of the plurality of VNFs different than the first VNF based on a threshold context switching limit.

Example 18

The system of claim 11, wherein the one VNF is not the first VNF.

Example 19

The system of claim 11, the circuitry to: determine, from a routing table, whether a one of the plurality of VNFs is associated with the context; and identify the first VNF as the one of the plurality of VNFs based on a determination that the one of the plurality of VNFs is associated with the context.

Example 20

The system of claim 11, the circuitry to route the packet to a second one of the plurality of VNFs in parallel to routing the packet to the one of the plurality of VNFs based at least in part on the context, the identified first VNF, and a target routing distribution for the plurality of VNFs.

Example 21

A method, comprising: extracting at least one field from a packet; determining a context associated with the packet based on the at least one field; identifying a first virtual network function (VNF) of a plurality of VNFs associated with the determined context; and routing the packet to a one of the plurality of VNFs based at least in part on the context, the identified first VNF, and a target routing distribution for the plurality of VNFs.

Example 22

The method of claim 21, wherein the one VNF is the first VNF.

Example 23

The method of claim 21, comprising maximizing adherence with the target routing distribution and minimizing routing the packet to the one of the plurality of VNFs different than the first VNF.

Example 24

The method of claim 21, comprising hashing the at least one field from the packet to determine the context.

Example 25

The method of claim 24, comprising: determining a hash bucket corresponding to the determined context based on the calculated hash function; counting a number of times packets have been routed to the hash bucket; and selecting the one of the plurality of VNFs to route the packet to based at least in part on the determined hash bucket and the number of times packets have been routed to the hash bucket.

Example 26

The method of claim 25, comprising determining the hash bucket based on the target routing distribution.

Example 27

The method of claim 21, comprising limiting routing the packet to the one of the plurality of VNFs different than the first VNF based on a threshold context switching limit.

Example 28

The method of claim 21, comprising: determining, from a routing table, whether a one of the plurality of VNFs is associated with the context; and identifying the first VNF as the one of the plurality of VNFs based on a determination that the one of the plurality of VNFs is associated with the context.

Example 29

The method of claim 21, comprising routing the packet to a second one of the plurality of VNFs in parallel to routing the packet to the one of the plurality of VNFs based at least in part on the context, the identified first VNF, and a target routing distribution for the plurality of VNFs.

Example 30

An apparatus comprising means to perform the method of any one of claims 21 to 29.

Example 31

A computer-readable storage medium that stores instructions for execution by a network virtualization function (NFV) load balancing switch, the instructions to cause the NFV load balancing switch to: extract at least one field from a packet; determine a context associated with the packet based on the at least one field; identify a first virtual network function (VNF) of a plurality of VNFs associated with the determined context; and route the packet to a one of the plurality of VNFs based at least in part on the context, the identified first VNF, and a target routing distribution for the plurality of VNFs.

Example 32

The computer-readable storage medium of claim 31, wherein the one VNF is the first VNF.

Example 33

The computer-readable storage medium of claim 31, comprising instructions to cause the NFV load balancing switch to maximize adherence with the target routing distribution and minimize routing the packet to the one of the plurality of VNFs different than the first VNF.

Example 34

The computer-readable storage medium of claim 31, comprising instructions to cause the NFV load balancing switch to hash the at least one field from the packet to determine the context.

Example 35

The computer-readable storage medium of claim 34, comprising instructions to cause the NFV load balancing switch to: determine a hash bucket corresponding to the determined context based on the calculated hash function; count a number of times packets have been routed to the hash bucket; and select the one of the plurality of VNFs to route the packet to based at least in part on the determined hash bucket and the number of times packets have been routed to the hash bucket.

Example 36

The computer-readable storage medium of claim 35, comprising instructions to cause the NFV load balancing switch to determine the hash bucket based on the target routing distribution.

Example 37

The computer-readable storage medium of claim 31, comprising instructions to cause the NFV load balancing switch to limit routing the packet to the one of the plurality of VNFs different than the first VNF based on a threshold context switching limit.

Example 38

The computer-readable storage medium of claim 31, comprising instructions to cause the NFV load balancing switch to: determine, from a routing table, whether a one of the plurality of VNFs is associated with the context; and identify the first VNF as the one of the plurality of VNFs based on a determination that the one of the plurality of VNFs is associated with the context.

Example 39

The computer-readable storage medium of claim 31, comprising instructions to cause the NFV load balancing switch to route the packet to a second one of the plurality of VNFs in parallel to routing the packet to the one of the plurality of VNFs based at least in part on the context, the identified first VNF, and a target routing distribution for the plurality of VNFs.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
    load balancer circuitry, at least a portion of which is implemented in hardware, the circuitry to:
        extract at least one field from a packet;
        determine a context associated with the packet based on the at least one field;
        determine, based on a routing table storing a plurality of contexts including the context associated with the packet, a first virtual network function (VNF) associated with the context, wherein the first VNF is one of a plurality of VNFs; and
        route the packet to the first VNF based at least in part on the context, the determined first VNF, and a target routing distribution for the plurality of VNFs.

2. The apparatus of claim 1, the circuitry to:
determine, based on at least one field of a second packet, that a context of the second packet is not defined;
define the context of the second packet in the routing table, the context of the second packet to associate the second packet with a second one of the plurality of VNFs; and
route the second packet to the second one of the plurality of VNFs based on the defined context of the second packet and the target routing distribution for the plurality of VNFs.

3. The apparatus of claim 1, the circuitry to maximize adherence with the target routing distribution and minimize routing the packet to a second VNF of the plurality of VNFs different than the first VNF based on the context not associating the packet with the second VNF.

4. The apparatus of claim 1, the circuitry to compute a hash value based on the at least one field from the packet to determine the context.

5. The apparatus of claim 4, the circuitry to:
determine a first hash bucket of a plurality of hash buckets corresponding to the computed hash value;
determine a number of times packets have been routed to the first hash bucket; and
select the first VNF to route the packet to based at least in part on the first hash bucket and the number of times packets have been routed to the first hash bucket.

6. The apparatus of claim 5, the circuitry to determine the first hash bucket based on the target routing distribution for the plurality of VNFs, the first hash bucket associated with the context.

7. The apparatus of claim 1, wherein the one of the plurality of VNFs is a second VNF of the plurality of VNFs, the circuitry to:
switch the context of the packet from the first VNF to the second VNF;
determine a number of context switches based on moving the context of the packet from the first VNF to the second VNF; and
limit routing the packet to a third VNF of the plurality of VNFs VNF based on a threshold number of context switches and the number of context switches.

8. The apparatus of claim 1, wherein the one of the plurality of VNFs is a second VNF of the plurality of VNFs, the context to associate the packet with the second VNF.

9. The apparatus of claim 1, the circuitry to route the packet to a second VNF of the plurality of VNFs in parallel to routing the packet to the one of the plurality of VNFs based at least in part on: the context associating the packet with the second VNF, the determined first VNF, and the target routing distribution for the plurality of VNFs.

10. A system comprising:
a plurality of virtual network functions (VNFs) hosted on one or more logical servers;
a memory comprising a network function virtualization (NFV) database (DB) coupled to the one or more logical servers, the NFV DB comprising indications of a plurality of contexts associated with one or more of the plurality of VNFs; and
a NFV load balancer comprising circuitry, at least a portion of which is implemented in hardware, the circuitry to:
extract at least one field from a packet;
determine a context associated with the packet based on the at least one field;
determine, based on the NFV DB, a first virtual network function (VNF) associated with the context, wherein the first VNF is one of the plurality of VNFs; and
route the packet to the first VNF based at least in part on the context, the determined first VNF, and a target routing distribution for the plurality of VNFs.

11. The system of claim 10, the circuitry to maximize adherence with the target routing distribution and minimize routing the packet to a second VNF of the plurality of VNFs different than the first VNF based on the context not associating the packet with the second VNF.

12. The system of claim 10, the circuitry to compute a hash value based on the at least one field from the packet to determine the context.

13. The system of claim 12, the circuitry to:
determine a first hash bucket of a plurality of hash buckets corresponding to the computed hash value;
determine a number of times packets have been routed to the first hash bucket; and
select the first VNF to route the packet to based at least in part on the first hash bucket and the number of times packets have been routed to the first hash bucket.

14. The system of claim 13, the circuitry to determine the first hash bucket based on the target routing distribution for the plurality of VNFs, the first hash bucket associated with the context.

15. The system of claim 10, the circuitry to route the packet to a second VNF of the plurality of VNFs in parallel to routing the packet to the first VNF based at least in part on: the context associating the packet with the second VNF, the determined first VNF, and the target routing distribution for the plurality of VNFs.

16. A method, comprising:
extracting at least one field from a packet;
determining a context associated with the packet based on the at least one field;
determining, based on a routing table storing a plurality of contexts including the context associated with the packet, a first virtual network function (VNF) associated with the context, wherein the first VNF is one of a plurality of VNFs; and
routing the packet to the first VNF based at least in part on the context, the determined first VNF, and a target routing distribution for the plurality of VNFs.

17. The method of claim 16, comprising maximizing adherence with the target routing distribution and minimizing routing the packet to a second VNF of the plurality of VNFs different than the first VNF based on the context not associating the packet with the second VNF.

18. The method of claim 16, comprising hashing the at least one field from the packet to determine the context.

19. The method of claim 18, comprising:
determining a first hash bucket of a plurality of hash buckets corresponding to the hashed at least one field;
determining a number of times packets have been routed to the first hash bucket; and
selecting the first VNF to route the packet to based at least in part on the first hash bucket and the number of times packets have been routed to the first hash bucket.

20. The method of claim 16, comprising routing the packet to a second VNF of the plurality of VNFs in parallel to routing the packet to the first VNF based at least in part on: the context associating the packet with the second VNF, the determined first VNF, and the target routing distribution for the plurality of VNFs.

* * * * *